(12) United States Patent
Clark et al.

(10) Patent No.: US 9,331,631 B2
(45) Date of Patent: May 3, 2016

(54) DIRECT CONNECTION OF LEAD BAR TO CONDUCTIVE RIBBON IN A THIN FILM PHOTOVOLTAIC DEVICE

(75) Inventors: Kim James Clark, The Dalles, OR (US); Max William Reed, Niwot, CO (US); Bradley Robert Crume, Lakewood, CO (US); Troy Alan Berens, Evergreen, CO (US)

(73) Assignee: First Solar, Inc., Tempe, AZ (US)

( * ) Notice: Subject to any disclaimer, the term of this patent is extended or adjusted under 35 U.S.C. 154(b) by 674 days.

(21) Appl. No.: 13/600,815

(22) Filed: Aug. 31, 2012

(65) Prior Publication Data

US 2014/0060621 A1 Mar. 6, 2014

(51) Int. Cl.
*H01L 31/05* (2014.01)
*H01L 31/02* (2006.01)
*H02S 40/34* (2014.01)

(52) U.S. Cl.
CPC ....................................... *H02S 40/34* (2014.12)

(58) Field of Classification Search
CPC .............. H01L 31/02002; H01L 31/02; H01L 31/0224; H01L 31/05; H01L 31/0512
USPC .................... 136/244, 251, 252, 256
See application file for complete search history.

(56) References Cited

U.S. PATENT DOCUMENTS

| 4,457,578 A | 7/1984 | Taylor |
| 2007/0113885 A1* | 5/2007 | Chan et al. .................... 136/256 |
| 2010/0061844 A1 | 3/2010 | Hudson et al. |
| 2010/0105245 A1 | 4/2010 | Good et al. |
| 2010/0252903 A1* | 10/2010 | Yamazaki et al. ............. 257/459 |
| 2011/0017279 A1 | 1/2011 | Baumback et al. |
| 2011/0232748 A1 | 9/2011 | Shimizu et al. |
| 2012/0024349 A1* | 2/2012 | Berens .......................... 136/251 |

(Continued)

FOREIGN PATENT DOCUMENTS

| DE | 102011076511 A1 | 8/2012 |
| EP | 2109149 | 10/2009 |
| EP | 1503426 | 2/2011 |

(Continued)

OTHER PUBLICATIONS

Extended European Search Report, Application No. EP13181238.0 dated Nov. 5, 2013.

*Primary Examiner* — Susan D Leong
(74) *Attorney, Agent, or Firm* — MacMillan, Sobanski & Todd, LLC

(57) ABSTRACT

Thin film photovoltaic devices that include at least one lead bar extending through a connection aperture defined in the encapsulation substrate are provided. The photovoltaic device can include: a transparent substrate; a plurality of photovoltaic cells on the transparent substrate; a first conductive ribbon electrically connected to a first photovoltaic cell; an encapsulation substrate laminated to the transparent substrate such that the plurality of photovoltaic cells and the conductive ribbon are positioned between the transparent substrate and the encapsulation substrate; and, a first lead bar extending through a first connection aperture defined in the encapsulation substrate. The first lead bar is electrically connected to the first conductive ribbon. For example, a meltable conductive material can be connected to the first lead bar and to the first conductive ribbon to establish an electrical connection therebetween. Methods are also provided for electrically connecting a lead to a thin film photovoltaic device.

13 Claims, 12 Drawing Sheets

(56) References Cited

U.S. PATENT DOCUMENTS

2012/0048334 A1    3/2012   Cohen et al.
2012/0152330 A1*   6/2012   Nakatani ........... H01L 31/02008
                                                             136/251

FOREIGN PATENT DOCUMENTS

| WO | WO 2009062326 | 5/2009 | |
|---|---|---|---|
| WO | WO2011024993 A1 * | 3/2011 | ............ H01L 31/042 |
| WO | WO 2012030758 | 3/2012 | |

* cited by examiner

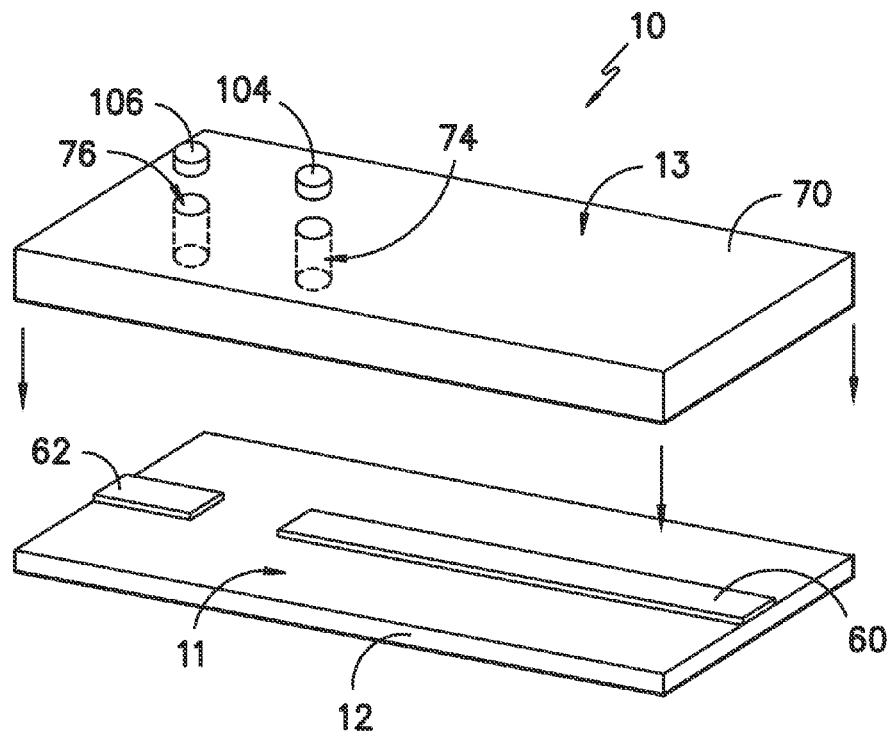
FIG. -1-
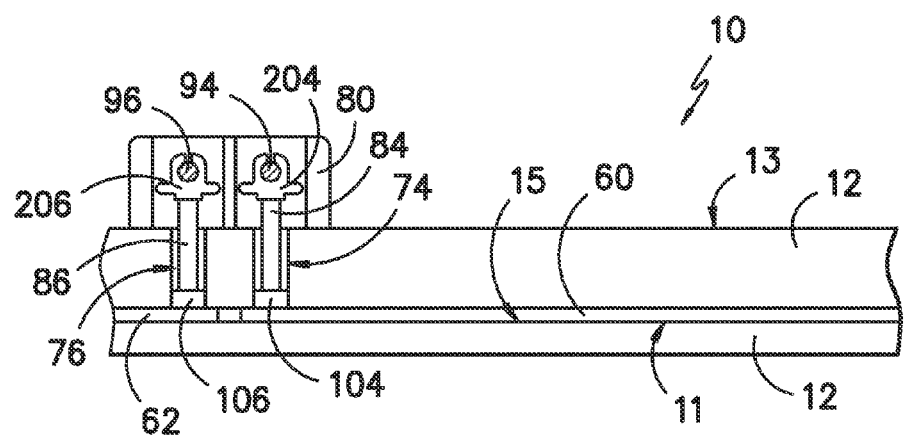
FIG. -2-

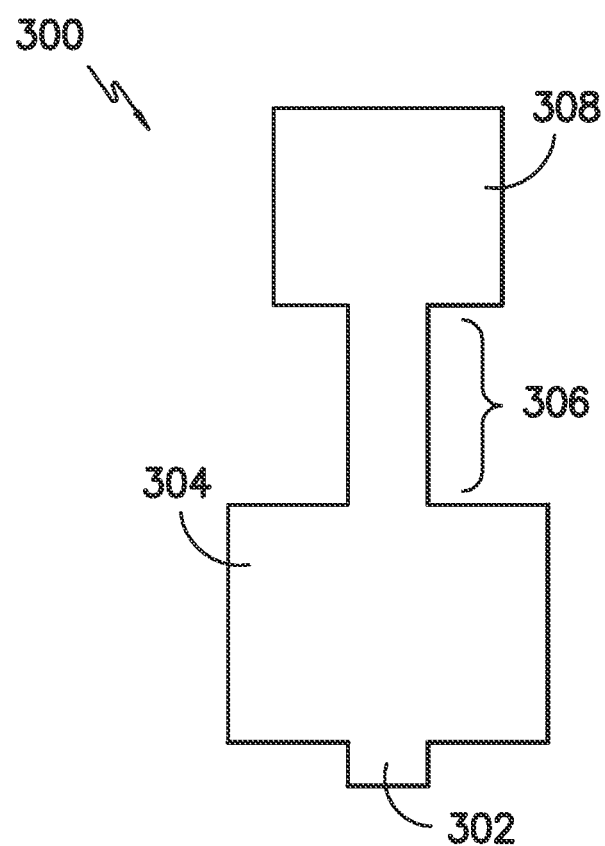
FIG. —3—

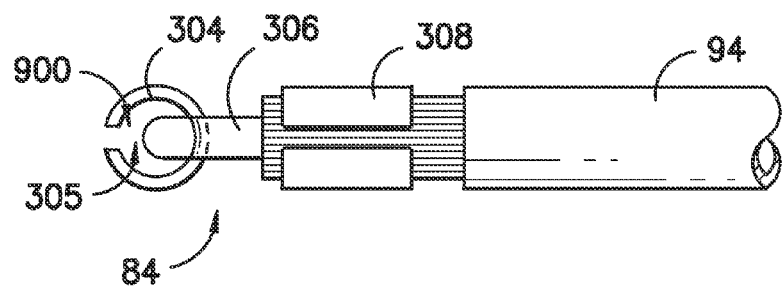
FIG. -4-
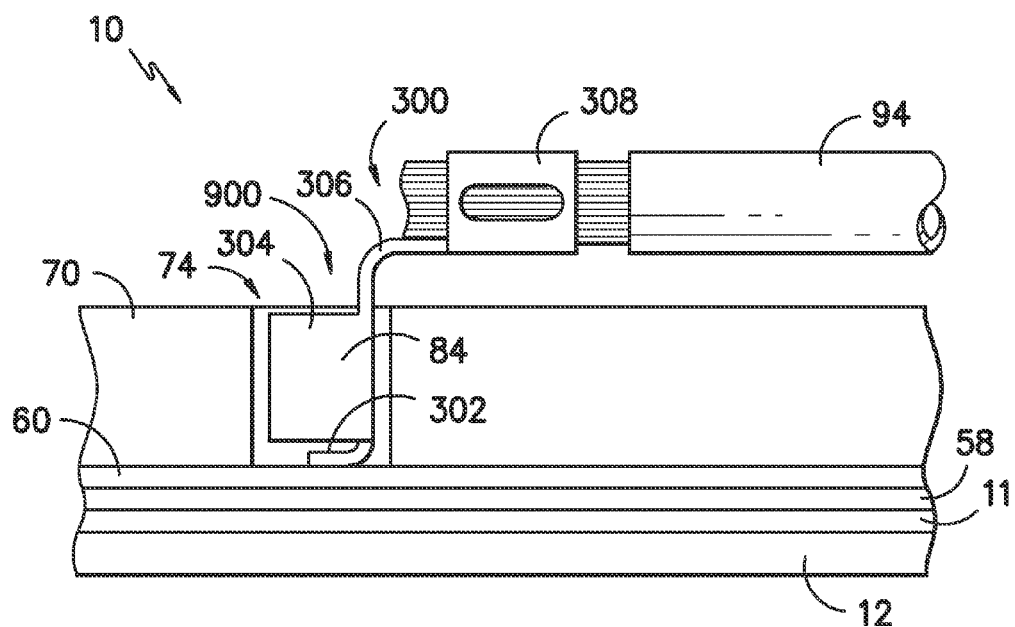
FIG. -5-

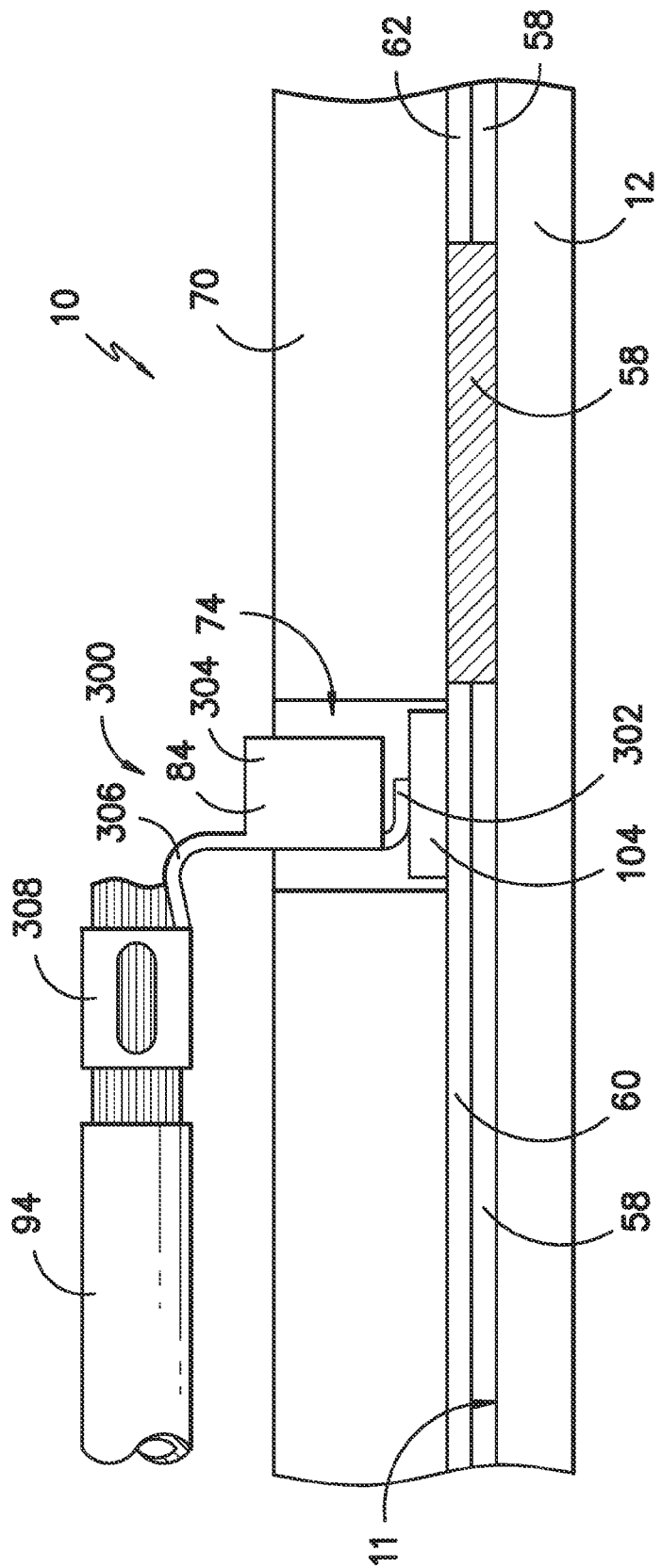
FIG. -6-

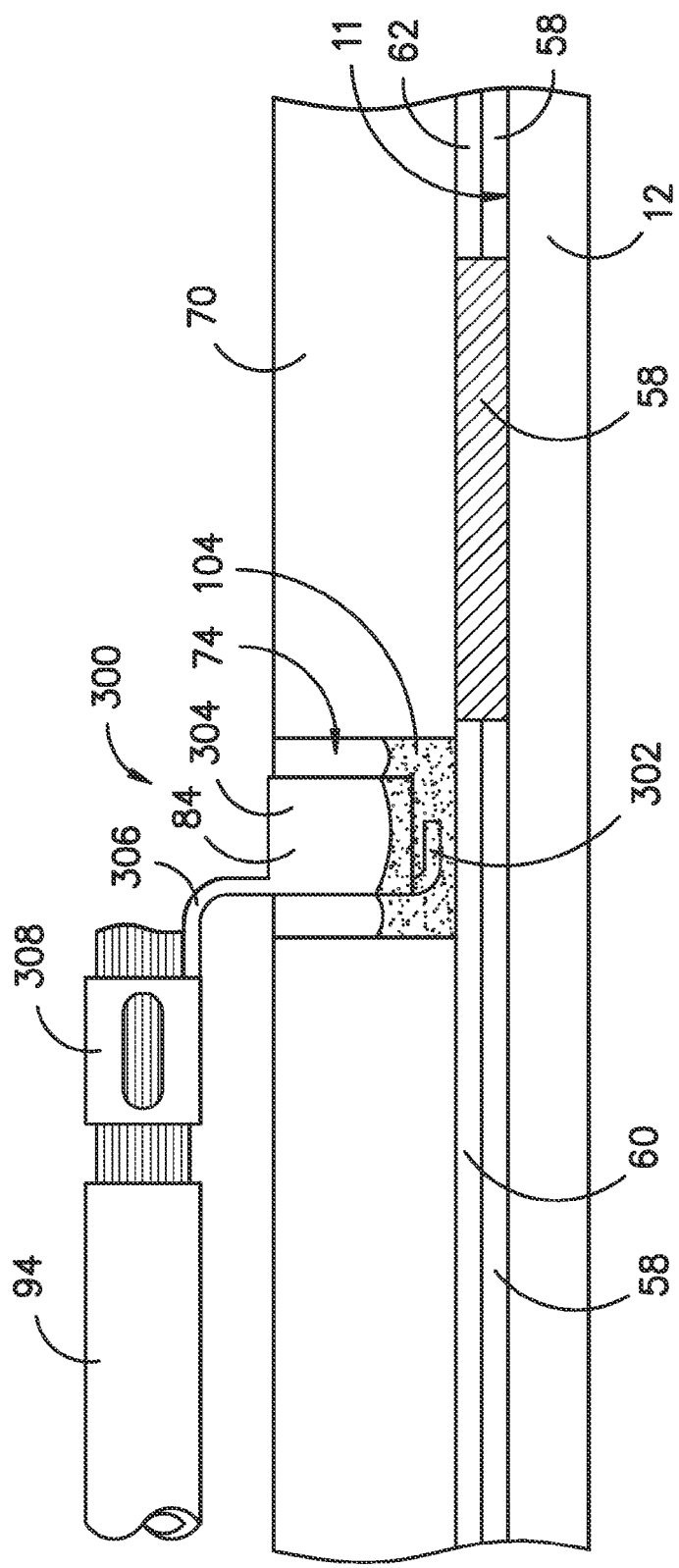
FIG. -7-

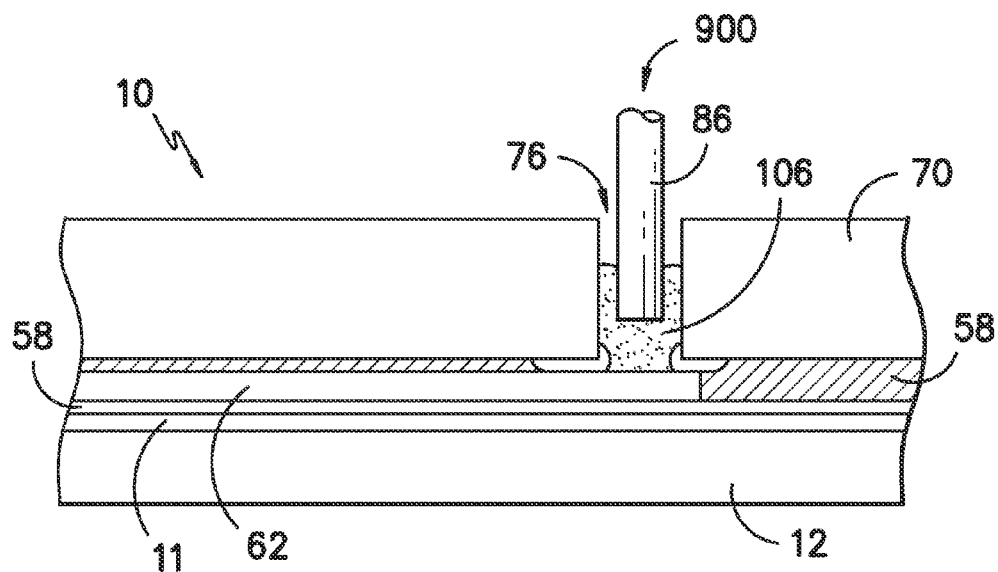
FIG. -8-
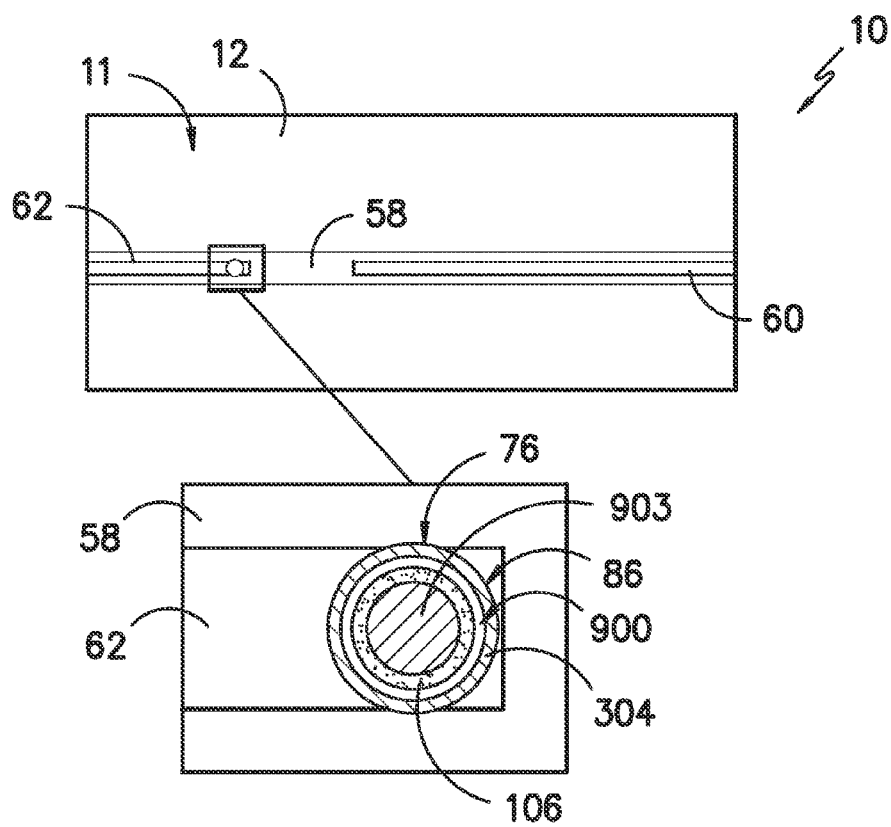
FIG. -9-

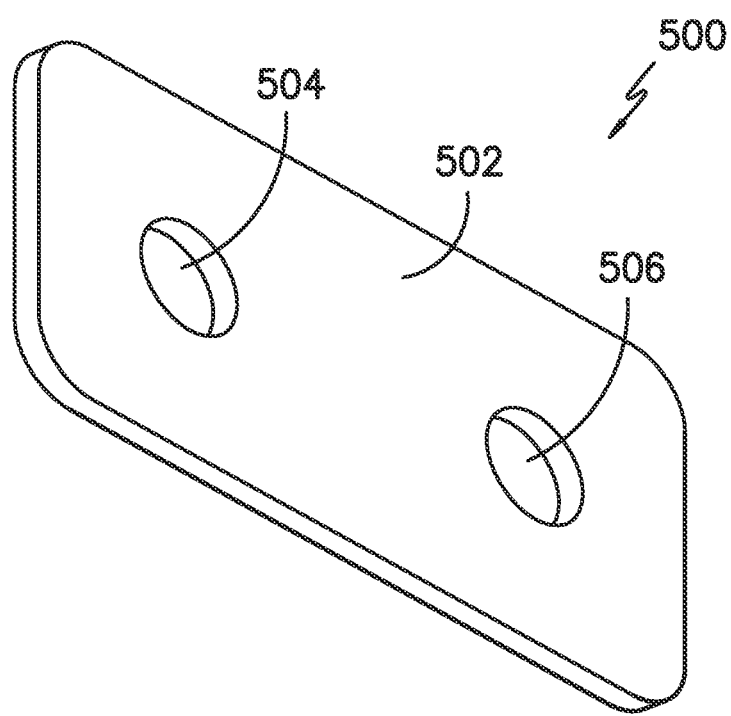
FIG. —10—

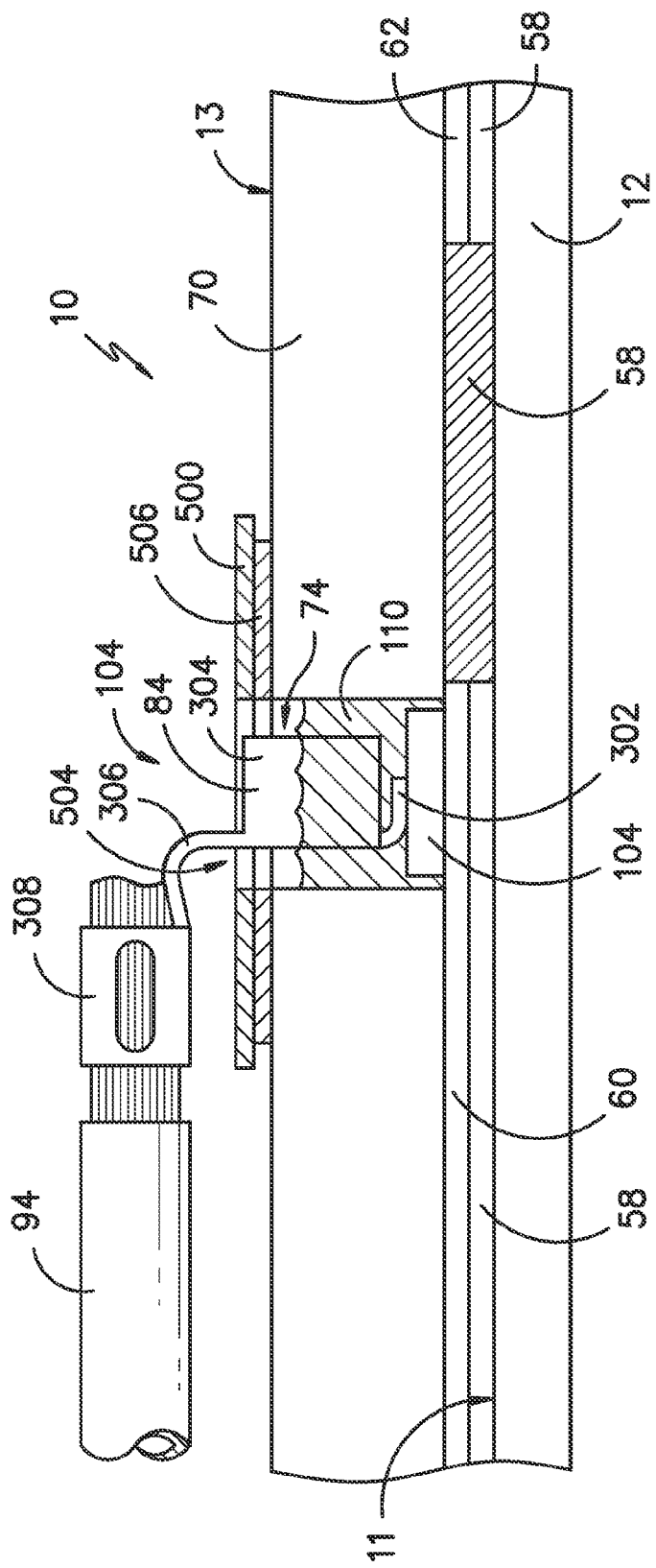
FIG. -11-

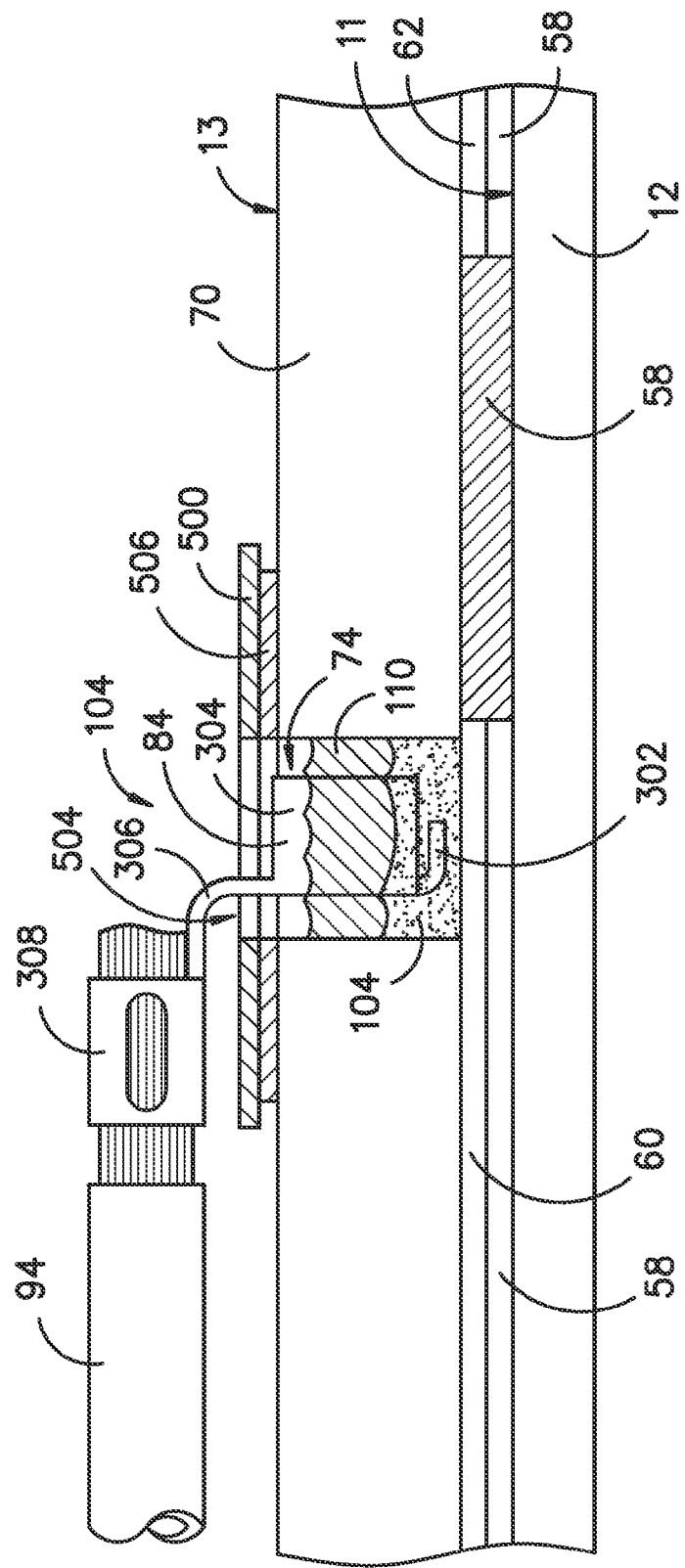
FIG. -12-

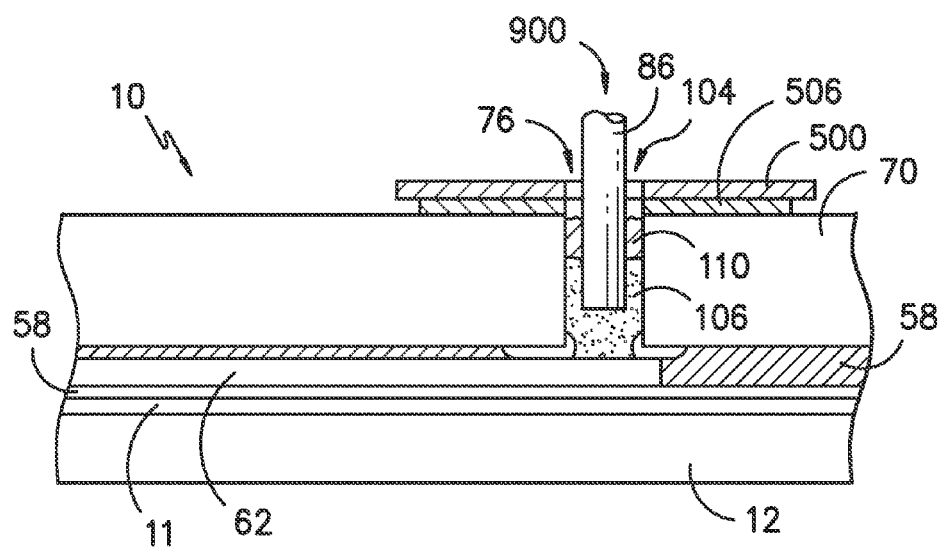
FIG. -13-

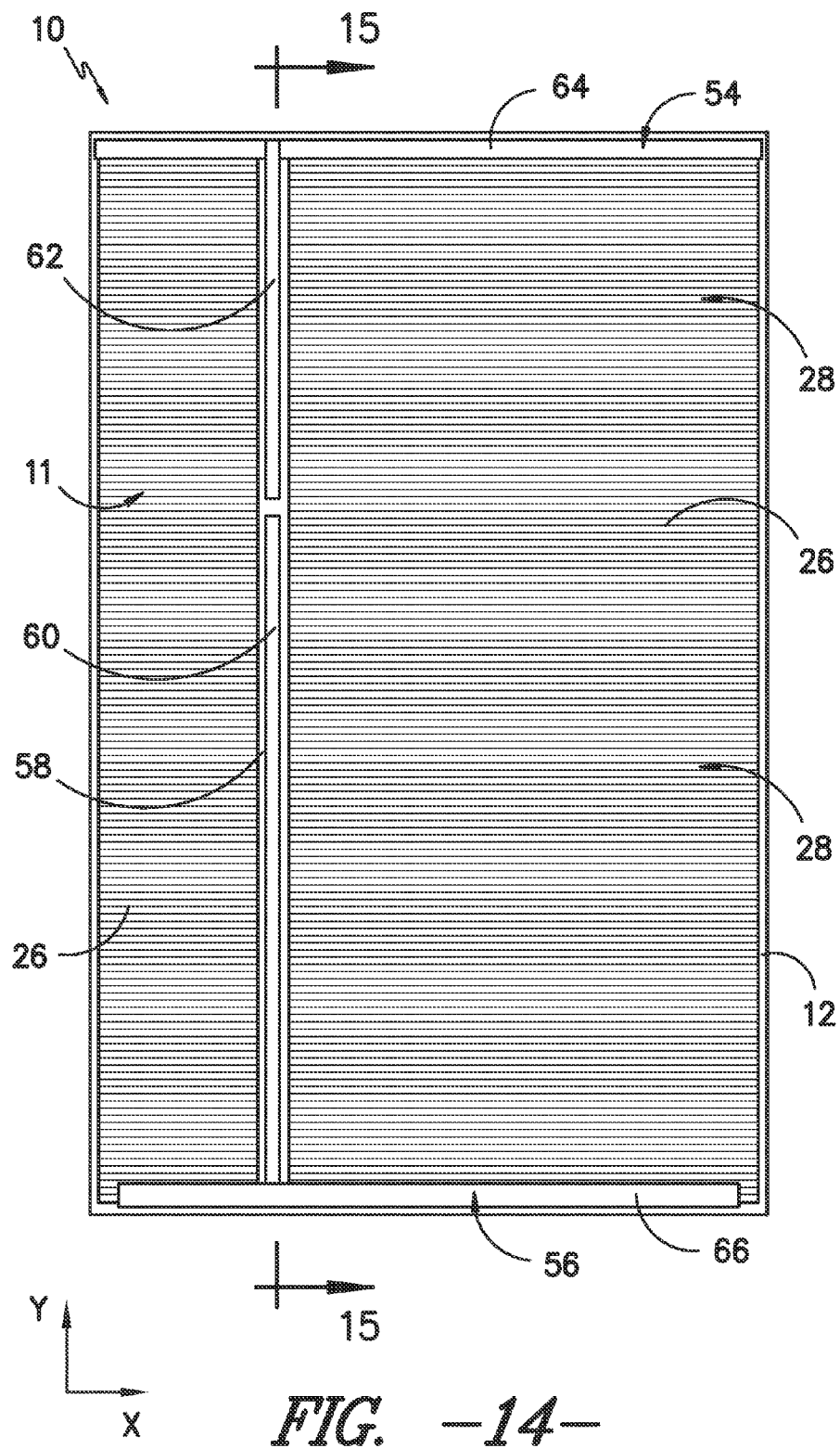
FIG. -14-

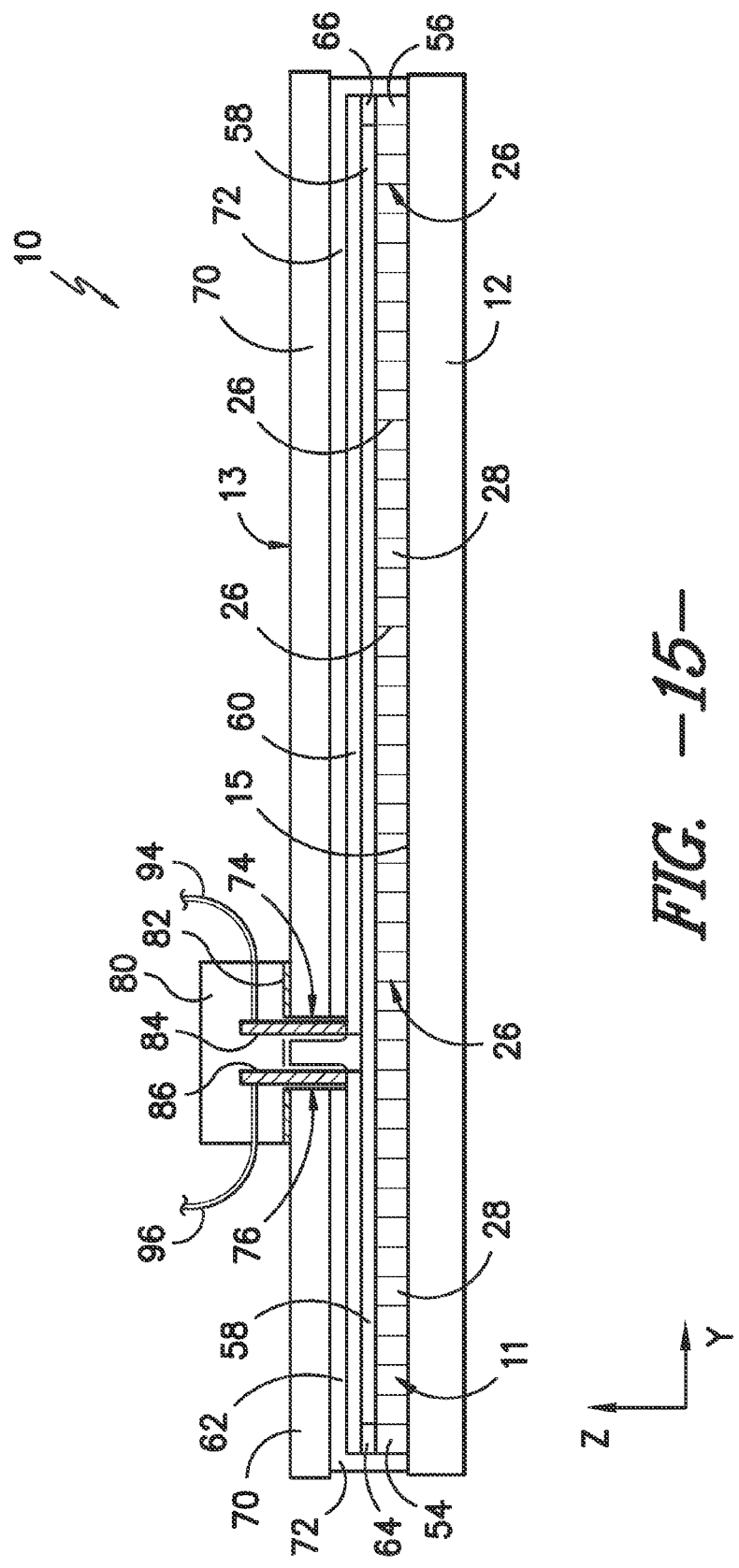
FIG. -15-

DIRECT CONNECTION OF LEAD BAR TO CONDUCTIVE RIBBON IN A THIN FILM PHOTOVOLTAIC DEVICE

FIELD OF THE INVENTION

Embodiments of the present invention are generally related to electrical attachment mechanisms and methods in thin film photovoltaic devices. In one particular embodiment, the present invention is generally related to photovoltaic devices having a direct electrical attachment of a solid lead through its back panel.

BACKGROUND OF THE INVENTION

In photovoltaic modules, a robust electrical connection must be made from the buss lines or conductive ribbons, to the transmission lines. In many cases there is a barrier to making this connection. Historically, a relatively large hole is introduced to the back of the module in order to access the ribbon. For example, in most instances, the conductive ribbons is pulled up through this hole and cut, creating flat tabs or flaps, then the entire assembly is laminated together. The ribbon tabs are connected to the transmission line via a junction box ("J-Box"). The tabs are then soldered or brazed to the leads within the J-Box, and the entire J-Box, hole, ribbon assembly is then filled with a sealant, or potting mixture, to eliminate moisture intrusion. This method of making an electrical connection is commonly a manual process due to the difficulty in automating the ribbon handling steps. If the entire process is automated, it can be costly and unreliable.

Additionally, the hole in the back of the module is a mechanical defect that compromises the integrity of the back panel by introducing irregular geometry, as well as the front panel by creating an area with less than adequate support for impact, like from hail or dropping the panel during installation. Such a hole presents a weak spot in the module that is susceptible to hail impact, particularly when paired with a relatively thin (e.g., 2 mm or less) front glass. This issue can be corrected by mechanically reinforcing the hole. However, reinforcing the hole adds a process step and an additional part to the bill of materials.

Thus, a need exists to establish an electrical connection via a more manufacturing friendly process, as well as to eliminate the mechanical integrity issues inherent with the large hole.

BRIEF DESCRIPTION OF THE INVENTION

Aspects and advantages of the invention will be set forth in part in the following description, or may be obvious from the description, or may be learned through practice of the invention.

Thin film photovoltaic devices are generally provided that include at least one lead bar extending through a connection aperture defined in the encapsulation substrate. In one embodiment, the photovoltaic device includes: a transparent substrate; a plurality of photovoltaic cells on the transparent substrate; a first conductive ribbon electrically connected to a first photovoltaic cell; an encapsulation substrate laminated to the transparent substrate such that the plurality of photovoltaic cells and the conductive ribbon are positioned between the transparent substrate and the encapsulation substrate; and, a first lead bar extending through a first connection aperture defined in the encapsulation substrate. The first lead bar is electrically connected to the first conductive ribbon. For example, a meltable conductive material can be connected to the first lead bar and to the first conductive ribbon to establish an electrical connection therebetween.

Methods are also generally provided for electrically connecting at least one lead to a thin film photovoltaic device. For example, an encapsulation substrate can be attached to a transparent substrate such that a first connection aperture defined in the encapsulation substrate is positioned adjacent to a first conductive ribbon positioned between the encapsulation substrate and the transparent substrate. A preform (e.g., comprising a meltable conductive material) can be positioned within the first connection aperture. Alternatively, a liquid meltable conductive material can be inserted into the first connection aperture. A first lead bar is inserted into the first connection aperture such that the first lead bar is adjacent to the meltable conductive material and extends out of a back surface of the encapsulation substrate. The meltable conductive material can then be heated to electrically connect the first conductive ribbon to the first lead bar via the meltable conductive material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 shows a perspective view of one embodiment for attaching a front substrate having conductive ribbons thereon to a back panel having preforms located within a pair of holes therein;

FIG. 2 shows a cross-sectional view of one embodiment of a photovoltaic device having a lead bar electrically connecting the junction box to the conductive ribbon;

FIG. 3 shows an exemplary stamped form for use as a lead bar according to one particular embodiment;

FIG. 4 shows the exemplary stamped form shown in FIG. 3 after coupling to a lead wire to form a lead bar;

FIG. 5 shows a close-up cross-sectional view of the lead bar of FIG. 4 establishing a direct electrical connection between the junction box and the conductive ribbon according to one embodiment;

FIG. 6 shows a close-up cross-sectional view of the lead bar of FIG. 4 and a preform establishing an electrical connection between the junction box and the conductive ribbon according to one embodiment;

FIG. 7 shows a close-up cross-sectional view of the lead bar of FIG. 4 and a meltable conductive material establishing an electrical connection between the junction box and the conductive ribbon according to one embodiment;

FIG. 8 shows a close-up cross-sectional view of another exemplary electrical connection of the junction box to the conductive ribbon utilizing another embodiment of a lead bar;

FIG. 9 shows a top view of another exemplary electrical connection of the junction box to the conductive ribbon with a sealed lead bar;

FIG. 10 shows an exemplary back plate that can be positioned on the back panel to add further mechanical integrity to the area of the connection holes;

FIG. 11 shows a close-up cross-sectional view of the device shown in FIG. 6 including a sealing material and the back plate of FIG. 10;

FIG. 12 shows a close-up cross-sectional view of the device shown in FIG. 7 including a sealing material and the back plate of FIG. 10;

FIG. 13 shows a close-up cross-sectional view of the device shown in FIG. 8 including a sealing material and the back plate of FIG. 10;

FIG. 14 shows a general schematic of an exemplary thin film photovoltaic device prior to laminations to an encapsulation substrate; and, FIG. 15 shows a cross-sectional view of the exemplary thin film photovoltaic device of FIG. 14 laminated to an encapsulation substrate.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Thin film photovoltaic ("PV") devices are generally provided having improved mechanical integrity at the point(s) of electrical connection from a conductive ribbon line(s) to a junction box(s) ("J-box), along with their methods of manufacture. In particular, a solid lead extending from the J-box is utilized to access and electrically connect to a connection ribbon below the surface of the back panel via insertion through a relatively small hole (e.g., having a diameter that is roughly equal to or less than the width of the ribbon) within the back panel. This electrical access can be achieved via direct contact between a given lead and corresponding ribbon and/or via an intermediary conductive material (e.g., adhesive, solder paste, etc.) deposited within the small hole. In the case of a mono-pole PV device design, the J-Box would have one lead that connects to one conductive ribbon. In the case of a bi-polar PV device design, the J-box would have two leads, each connected to a different connection ribbon. In other module designs, there could be many leads to connect to the many connection ribbons.

The resulting device is less susceptible to hail damage due to the small diameter of the connection aperture through the encapsulation substrate, as well as the fill of the connection aperture via by the lead bar, alone or in combination with an optional filling material (e.g., a meltable conductive material and/or a sealing material). In particular, the relatively small diameter of the connection aperture(s) results in higher shatter resistance due to the cavity being filled and reinforced with conductive material and because of the diameter relative to the size and shape of the potentially damaging hail.

Also, due to the design options, the J-box can easily be assembled to the back of the device in an automated fashion. For example, when used, preforms can be placed, or the solder (paste-form or molten) and/or adhesive can be injected into the holes, and the J-box housing can be adhered onto the back of the encapsulation substrate by lining up the lead bar(s) with the connection aperture(s) defined in the encapsulation substrate using a simple vision system and robotic arm.

FIGS. 14 and 15 show an exemplary thin film photovoltaic device 10 that includes a film stack 11 that defines a plurality of photovoltaic cells 28 separated by scribe lines 26. It is noted that each of the scribe lines 26 shown can be multiple scribe lines depending on the configuration of the device 10. For example, each of the scribe lines 26 can actually be three scribe lines: a first isolation scribe, a series connecting scribe and a second isolation scribe. However, due to the presence of a metal contact layer covering the first isolation scribe and filling the series connecting scribe, only the second isolation scribe lines are visible and thus appear to be a single scribe line 26 in the device 10.

As stated, the thin film stack 11 defines individual solar cells 28 (also referred to as photovoltaic cells) separated by scribes 26 to collectively form a plurality of serially connected solar cells. Specifically, the individual photovoltaic cells 28 are electrically connected together in series. In one particular embodiment, the thin film stack 11 includes a transparent conductive oxide layer on the inner surface 15 of the transparent substrate 12 (serving as a superstrate), an optional resistive transparent buffer layer on the transparent conductive oxide layer, an n-type window layer (e.g., comprising cadmium sulfide) on the transparent conductive oxide layer, an absorber layer (e.g., comprising cadmium telluride) on the n-type window layer, and a back contact on the absorber layer (e.g., a graphite layer and/or a metal contact layer). It is, however, to be understood that other material combinations could instead be used to form the back contact and that such combinations are considered to be within the scope of presently disclosed device. Other layers may also be present in the thin film stack 11. For example, index matching layers may be present between the transparent conductive oxide layer and the inner surface of the superstrate. Additionally, an oxygen getter layer may be present in the thin film stack, such as adjacent to the transparent conductive oxide layer (e.g., between the transparent conductive oxide layer and the optional resistive transparent buffer layer).

The plurality of serially connected solar cells 28 are between a dead cell 54 and a terminal cell 56. As shown, the dead cell 54 and the terminal cell 56 are positioned on opposite ends of the plurality of serially connected solar cells 28 in the y-direction of the device 10. The back contact of the dead cell 54 serves as an electrical connector for the device 10, while the TCO layer of the terminal cell 56 serves as the opposite electrical connector for the device 10. As such, the dead cell 54 does not produce a charge in the thin film stack 11, while the terminal cell 56 may.

FIG. 14 generally shows a top view of an exemplary thin film photovoltaic device 10 defining a plurality of photovoltaic cells 28 separated by scribes 26. The scribes 26 can be, in one embodiment, substantially parallel to each other such that the photovoltaic cells 28 are substantially the same size. As shown, each of the scribes 26 is generally oriented in the x-direction.

An insulating layer 58 is on the thin film stack 11 to protect the back contact of the thin film stack 11. The insulating layer 58 generally includes an insulating material that can prevent electrical conductivity therethrough. Any suitable material can be used to produce the insulating layer 58. In one embodiment, the insulating layer 58 can be an insulating polymeric film coated on both surfaces with an adhesive coating. The adhesive coating can allow for adhesion of the insulating layer 58 to the underlying thin film stack 11 and for the adhesion of the conductive strip 60, 62 to the insulating layer 58. For example, the insulating layer 58 can include a polymeric film of polyethylene terephthalate (PET) having an adhesive coating on either surface. The adhesive coating can be, for example, an acrylic adhesive, such as a thermosetting acrylic adhesive.

In one particular embodiment, the insulating layer 58 is a strip of insulating material generally oriented in a direction substantially perpendicular to the orientation of the scribes 26. For example, the insulating layer 58 can be generally oriented in the y-direction that is substantially perpendicular to the orientation of the scribes 26 in the x-direction.

The insulating layer 58 can have a thickness in the z-direction suitable to prevent electrical conductivity from the underlying thin film layers, particularly the back contact, to any subsequently applied layers. In one particular embodiment, the insulating layer 58 can prevent electrically conductivity between the thin film stack 11 and the conductive strips 60, 62.

The conductive strips 60, 62, in one embodiment, can be applied as a continuous strip over the insulating layer 58, and then severed to produce a first conducting ribbon 60 and a second conducting ribbon 62, as shown in FIGS. 14-15. The conductive ribbons 60, 62 can be constructed from any suitable material. In one particular embodiment, the conductive strips 60, 62 are a strip of metal foil. For example, the metal foil can include a conductive metal.

Bus bars 64, 66 can then be attached over the terminal cell 56 and the dead cell 54, respectively, of the photovoltaic device 10 to serve as an opposite electrical connections. The encapsulating substrate 70 can be adhered to the photovoltaic device 10 via an adhesive layer 72. The adhesive layer 72 is generally positioned over the conductive strips 60, 62, the insulating layer 58, and any remaining exposed areas of the thin film stack 11. For example, the adhesive layer 72 can define adhesive gaps that generally corresponds to the connection apertures 74, 76 defined by the encapsulating substrate 70. As such, the first conducting ribbon 60 and a second conducting ribbon 62 can be accessible through the adhesive gaps and the connection apertures 74, 76. The adhesive layer 72 can generally provide mechanical stability within the connection apertures 74, 76 and can also protect the thin film stack 11 and attach the encapsulating substrate 70 to the device 10. The adhesive layer 72 can be constructed from ethylene vinyl acetate (EVA), polyvinyl butyral (PVB), silicone based adhesives, or other adhesives which are configured to prevent moisture from penetrating the device.

A junction box 80 can also be included in the device and can be configured to electrically connect the photovoltaic device 10 by completing the DC circuit via a pair of lead bars 84, 86 that are electrically connected to a pair of wires 94, 96, respectively, for collection of the current generated by the device 10. In particular, the first lead bar 84 and a second lead bar 86 extend from the junction box 80 and, respectively, through the first connection aperture 74 and the second connection aperture 76. As shown in FIG. 15, the first lead bar 84 is electrically connected to the first conductive ribbon 60, and the second lead bar 86 is electrically connected to the second conductive ribbon 62. As will be discussed in greater detail below, the electrical connection between the lead bar 84, 86 and its respective conductive ribbon 60, 62 can be made either directly or indirectly through a conductive material.

In one embodiment, the connection apertures 74, 76 can have a maximum diameter that is substantially equal to or less than the width of their respective conductive ribbons 60, 62. For example, the connection apertures 74, 76 can have a maximum diameter that is about 50% to about 100% of the width of their respective conductive ribbons 60, 62 (e.g., about 55% to about 90%). As such, the size of the connection apertures 60, 62 can be minimized, while still allowing for an adequate electrical connection to be made for current collection from the device 10.

Although described with respect to the embodiment of FIG. 14, the present disclosure is not intended to be limited to any particular photovoltaic device design. It is contemplated that other photovoltaic device designs can be utilized.

FIG. 1 shows one embodiment of the lamination of an encapsulation substrate 70 to a transparent substrate 12 such that the thin film stack 11 (defining a plurality of photovoltaic cells) and the conductive ribbons 60, 62 are positioned between the transparent substrate 12 and the encapsulation substrate 70 during the manufacture of the exemplary PV device 10. The encapsulation substrate 70 is positioned such that the first conducting ribbon 60 and the second conducting ribbon 62 are accessible through, respectively, the first connection aperture 74 and the second connection aperture 76 defined in the encapsulation substrate 70.

As shown, a pair of preforms 104, 106 are inserted into the connection apertures 74, 76 either before, during, or after lamination of the encapsulation substrate 70 onto the transparent substrate 12. Each of the preform 104, 106 includes a meltable conductive material. Thus, the meltable conductive material of the preforms 104, 106 can electrically connect to the lead bars 84, 86 to the respective conductive ribbon 60, 62. Suitable meltable conducive materials can include, but are not limited to metallic materials and alloys, solder materials, etc.

In addition to the preforms, or in the alternative to the preforms, a solder paste (as a liquid) can be inserted into the connection apertures 74, 76 either before, during, or after lamination of the encapsulation substrate 70 onto the transparent substrate 12.

For example, the meltable conductive material can generally include any suitable solder material, including but not limited to, tin, lead, antimony, bismuth, indium, silver, copper, cadmium, or alloys thereof, or mixtures thereof. Generally, the solder material may be configured to melt at a solder temperature of about 150° C. to about 250° C. (e.g., a soft solder) to ensure that melting the solder can occur without significantly affecting the other components of the device 10. Both lead-based solders and non-lead-based solders may prove useful for this application.

FIG. 2 shows the assembled device of FIG. 1 after positioning of a junction box 80 on the exposed surface 13 of the encapsulation substrate 70 that is opposite of the transparent substrate 12. As shown, the first lead bar 84 extends through the first connection aperture 74 and is electrically connected to a first wire 94 via a crimp 204, and the second lead bar 86 extends through the second connection aperture 76 and is electrically connected to a second wire 96 via a crimp 206. The preforms 104 and 106 are positioned, respectively, within the connection apertures 74, 76 to electrically connect the lead bars 84, 86 to the corresponding conductive ribbon 60, 62. Thus, in this configuration, the lead bars 84, 86 can be indirectly connected, through the meltable conductive material of the preforms 104, 106, to the respective conductive ribbons 60, 62. In alternative embodiments, the lead bars 84, 86 can be directly connected to the respective conductive ribbons 60, 62 (e.g., through a mechanically biasing force, welding, etc.), without the presence of any meltable conductive material.

As illustrated in FIG. 9 with respect to the second lead bar 86, the lead bar 86 can define a lead aperture 900 though its construction providing access to the underlying preform 106.

In one embodiment, a heating element 902 can be inserted into the lead aperture 900 and heat the underlying preform 106, causing the meltable conductive material to bond to each of the lead bar 86 and the conductive ribbon 62. Thus, after the heating element 900 is removed from the lead aperture 900, FIG. 8 shows a cross-sectional view of the resulting device 10 where the preform 106 is electrically connected the conductive ribbon 62 to the lead bar 86.

FIG. 3 shows an exemplary stamped form 300 that can be utilized to form either or both of the lead bars 84, 86, as shown in FIGS. 4-7 and 11-12. The stamped form 300 defines a lead tab 302 extending off of a lead body 304. The lead body 304 can be molded (e.g., bent, shaped, or otherwise deformed) into a shape that resembles the shape of the connection aperture of the device 10. Thus, the lead body 304 can be sized to the particular shape and/or dimensions of the connection aperture to ensure a secure fit therein. For example, the lead body 304 can be formed into a substantially circular hollow bar having a first bar diameter. The connection aperture 74, 76 can define a similar shape (e.g., substantially circular) that has a first aperture diameter, and the first aperture diameter can be about 100% to about 250% of the first bar diameter to enable a relatively easy fit therein. For example, the connection aperture 74, 76 can have a first aperture diameter, and the first aperture diameter can be about 125% to about 175% of the first bar diameter.

The lead tab 302 extends from the lead body 304 and is generally configured to establish a mechanical connection having a biasing force between the lead bar 300 and the conductive ribbon 60, such as shown in FIG. 5. In particular, the lead tab 302 is configured to bend, upon application of an insertion force to the lead body 304, such that the lead tab 302 establishes a biasing force between the lead body 304 and the conductive ribbon 60.

The stamp form 300 also defines a crimp section 308 that is configured to be electrically connected to a wire 94 (e.g., crimped by surrounding the wire 94, either circumscribing the entire or a portion of the wire 94). A shank bar 306 is also defined by the stamped form 300 between the crimp section 308 and the lead body 304. In use, the shank bar 306 is configured and sized to extend out of the connection aperture 74 and bridge (mechanically and electrically) the lead tab 302 and lead body 304 to the crimp section 308. Thus, the wire 94 can be electrically connected to the conductive ribbon 60 via the stamped form 300 serving as the lead bar 84.

Due to is relatively small width when stamped (i.e., less than the diameter of the lead body 304 and/or the crimp section 308), the shank bar 306 can be positioned and/or bent as desired. For example, bending the form 300 as the shank bar 306 extends out of the connection aperture 74 allows for the insertion of a heating element through the lead aperture 900 defined by the curved lead body 304. Additionally, the shank bar 306 can serve as a shock absorber and/or flexible pivot that allows the connected wire 94 to move without transferring significant force to the device 10, particularly the encapsulating substrate 70 via the connection aperture 74. As such, the shank bar 306 can substantially avoid transferring stress from to the solder joint.

FIG. 6 shows the stamped form 300 used in a device 10, similar to that shown in FIG. 5, with a preform 104 positioned within the connection aperture 74. After heating, the meltable conductive material of the preform can electrically connect and secure the form 300 (particularly the lead tab 302 and/or the lead body 304) to the underlying conductive ribbon 60.

Alternatively or additionally, the lead body 304 can be shaped around a preform 104 and then inserted together into the connection aperture 74. The meltable conductive material can then be melted (e.g., via a heating element inserted into the lead aperture 305 defined by the lead body 304) to electrically secure the conductive ribbon 60 to the lead bar 84 formed by the stamped form 300.

As shown in FIGS. 11-13, the connection apertures 74, 76 can be filled with a sealing material 110 after the electrical connection is made between the lead bar 84, 86 and the respective underlying conductive ribbons 60, 62, according to particular embodiments. The sealing material can help to inhibit moisture intrusion through connection apertures 74, 76 into the device 10. Suitable sealing materials can be selected for its moisture barrier properties and its adhesion characteristics.

In one embodiment, the sealing material can include a synthetic polymeric material, such as a butyl rubber or other rubber material. Though the exact chemistry of the butyl rubber can be tweaked as desired, most butyl rubbers are a copolymer of isobutylene with isoprene (e.g. produced by polymerization of about 98% of isobutylene with about 2% of isoprene). One particularly suitable synthetic polymeric material for use in the sealing layer 22 is available commercially under the name HelioSeal® PVS 101 from ADCO Products, Inc. (Michigan Center, Mich.).

The synthetic polymeric material can, in one embodiment, melt at the lamination temperature, reached when the encapsulating substrate 70 is laminated to the substrate 12, such that the synthetic polymeric material melts and/or otherwise conforms and adheres to form a protected area on the thin film layers 11 where the connection aperture(s) is located on the device 10. For instance, the synthetic polymeric material can melt at laminations temperatures of about 120° C. to about 160° C.

FIG. 10 shows a back plate 500 that can be adhered (e.g., via adhesive layer 506) to the exposed surface 13 of the encapsulation substrate 70 that is positioned opposite from the transparent substrate 12, as shown in FIGS. 11-13. Generally, the back plate 500 defines a first support aperture 504 and a second support aperture 506 which are aligned with the connection apertures 74, 76, respectively, in the encapsulation substrate 70. Although shown with two support apertures 504, 506, it is to be understood that any suitable number of support apertures can be included in the back plate 500 to match and align with the number of connection apertures defined in the encapsulation substrate 70.

As shown in FIGS. 11-13, the back plate 500 is positioned such that the first lead bar 84 extends through the first support aperture 504 and the first connection aperture 74 to electrically connect to the underlying conductive ribbon 60. As such, the junction box 80, as shown in FIG. 2, can be attached to the back surface 502 of the back plate 500.

Although described with reference to the embodiment shown in FIGS. 14-15, other device configurations can be similarly used to form the thin film photovoltaic device 10, such as a three terminal thin film device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A thin film photovoltaic device, comprising:
a transparent substrate;
a plurality of photovoltaic cells on the transparent substrate;
a first conductive ribbon electrically connected to a first photovoltaic cell;
an encapsulation substrate laminated to the transparent substrate such that the plurality of photovoltaic cells and the conductive ribbon are positioned between the transparent substrate and the encapsulation substrate;
a first lead bar extending through a first connection aperture defined in the encapsulation substrate, wherein the first lead bar is electrically connected to the first conductive ribbon; and,
a meltable conductive material connected to the first lead bar and to the first conductive ribbon to establish an electrical connection therebetween; and
a back plate adhered to an exposed surface of the encapsulation substrate that is opposite of the transparent substrate, wherein the back plate defines a support aperture and is positioned such that the first lead bar extends through the support aperture.

2. The device as in claim 1, wherein the meltable conductive material is a solder comprising tin, lead, antimony, bismuth, indium, silver, copper, cadmium, or alloys thereof.

3. The device as in claim 1, further comprising:
a sealing material filling the first connection aperture with the first lead bar extending therethrough.

4. The device as in claim 1, wherein the first connection aperture defines a first aperture diameter, and wherein the first conductive ribbon defines a first ribbon width, the first aperture diameter being less than the first ribbon width.

5. The device as in claim 1, wherein the first lead bar has a first bar diameter, and wherein the first connection aperture defines a first aperture diameter, the first aperture diameter being about 100% to about 105% of the first bar diameter.

6. The device as in claim 3, wherein the sealing material comprises synthetic polymeric material.

7. The device as claim 1, further comprising:
a second conductive ribbon electrically attached to a second photovoltaic cell and positioned between the transparent substrate and the encapsulation substrate; and,
a second lead bar extending through a second connection aperture defined in the encapsulation substrate, wherein the second lead bar is electrically connected to the second conductive ribbon.

8. The device as claim 1, further comprising:
a second conductive ribbon electrically attached to a second photovoltaic cell and positioned between the transparent substrate and the encapsulation substrate; and
a second lead bar extending through a second connection aperture defined in the encapsulation substrate, wherein the second lead bar is electrically connected to the second conductive ribbon; and,
wherein the back plate defines a second support aperture and the second lead bar extends through the second support aperture.

9. The device as in claim 1, further comprising:
a junction box positioned on the exposed surface of the encapsulation substrate that is opposite of the transparent substrate, wherein the first lead bar extends out of the first connection aperture and is electrically connected to a first wire of the junction box.

10. The device as in claim 1, wherein the first lead bar defines a first lead aperture therethrough.

11. The device as in claim 10, wherein the first lead aperture is filled with the meltable conductive material.

12. The device as in claim 11, wherein the first lead aperture is filled with a sealing material.

13. The device as in claim 1, wherein the first lead bar defines a first lead tab configured to establish a mechanical connection having a biasing force between the first lead bar and the first conductive ribbon.

* * * * *